(12) United States Patent
Kintrup et al.

(10) Patent No.: US 9,677,183 B2
(45) Date of Patent: Jun. 13, 2017

(54) ELECTROCATALYST, ELECTRODE COATING AND ELECTRODE FOR THE PREPARATION OF CHLORINE

(71) Applicants: Covestro Deutschland AG, Leverkusen (DE); Nano-X-Gmbh, Saarbrücken (DE)

(72) Inventors: Juergen Kintrup, Leverkusen (DE); Andreas Bulan, Langenfeld (DE); Elin Hammarberg, Saarbrücken (DE); Stefan Sepeur, Wadgassen (DE); Gerald Frenzer, Saarbrücken-Fechingen (DE); Frank Gross, Merzig (DE); Stefanie Eiden, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 166 days.

(21) Appl. No.: 14/174,037

(22) Filed: Feb. 6, 2014

(65) Prior Publication Data
US 2014/0224666 A1 Aug. 14, 2014

(30) Foreign Application Priority Data

Feb. 8, 2013 (DE) ................. 10 2013 202 144

(51) Int. Cl.
| | |
|---|---|
| C25B 11/04 | (2006.01) |
| C25B 1/26 | (2006.01) |
| C25B 1/34 | (2006.01) |
| B01J 23/38 | (2006.01) |
| B01J 23/46 | (2006.01) |
| B01J 23/644 | (2006.01) |
| H01M 4/90 | (2006.01) |
| H01M 4/92 | (2006.01) |

(52) U.S. Cl.
CPC ......... C25B 11/0484 (2013.01); B01J 23/462 (2013.01); B01J 23/468 (2013.01); B01J 23/6445 (2013.01); C25B 1/26 (2013.01); C25B 1/34 (2013.01); C25B 11/0415 (2013.01); H01M 4/9016 (2013.01); H01M 4/9041 (2013.01); H01M 4/92 (2013.01)

(58) Field of Classification Search
CPC .................................................. C25B 11/0484
See application file for complete search history.

(56) References Cited

U.S. PATENT DOCUMENTS

| | | | |
|---|---|---|---|
| 3,793,164 A * | 2/1974 | Kolb | C25B 11/0484 205/528 |
| 8,492,303 B2 | 7/2013 | Bulan | |
| 2005/0186345 A1 | 8/2005 | Shibata et al. | |
| 2007/0292744 A1* | 12/2007 | Lopez | B01J 23/468 429/418 |
| 2011/0024289 A1* | 2/2011 | Bulan | B01J 23/462 204/290.12 |
| 2013/0213799 A1 | 8/2013 | Bulan et al. | |

FOREIGN PATENT DOCUMENTS

| | | |
|---|---|---|
| DE | 2245709 A1 | 4/1973 |
| DE | 602005002661 T2 | 1/2008 |
| DE | 102009035546 A1 | 2/2011 |
| WO | 2006/002843 A1 | 1/2006 |

* cited by examiner

Primary Examiner — Nicholas A Smith
(74) Attorney, Agent, or Firm — Drinker Biddle & Reath LLP

(57) ABSTRACT

Electrocatalyst, electrode coating and an electrode for preparing chlorine and process for producing the electrode, the electrocatalyst comprising a noble metal oxide and/or a noble metal of transition groups VIIIa of the Periodic Table of the Elements and at least one finely divided pulverulent oxide of another metal, in which one or more components are doped and the base metal oxide powder is chemically stable in the presence of aqueous electrolytes.

20 Claims, No Drawings

ELECTROCATALYST, ELECTRODE COATING AND ELECTRODE FOR THE PREPARATION OF CHLORINE

The invention proceeds from known catalyst-coated electrodes and electrode coatings for electrolysis processes for preparing chlorine.

BACKGROUND OF THE INVENTION

The invention relates to novel catalysts, electrode coatings and electrodes for the preparation of chlorine. Chlorine is usually produced industrially by electrolysis of sodium chloride or hydrochloric acid or by gas-phase oxidation of hydrogen chloride (Schmittinger, Chlorine, Wiley-VCH 1999, pages 19-27). If electrolysis processes are used, the chlorine is produced at the anode. As anode material, use is usually made of titanium as electrode material on the surface of which an electrochemically active catalyst is present. The surface layer containing the catalyst is usually also referred to as a coating. The tasks performed by the catalyst are reducing the overvoltage and avoiding evolution of oxygen at the anode (Winnacker-Küchler, Chemische Technik, Prozesse und Produkte, 5th edition, Wiley-VCH 2005, pages 469-470).

In the preparation of chlorine by electrolysis of hydrochloric acid, graphite anodes are usually used (Winnacker-Küchler, Chemische Technik, Prozesse und Produkte, 5th edition, Wiley-VCH 2005, page 514). In the electrolysis of hydrochloric acid, in which, for example, a gas diffusion electrode is used on the cathode side, it is possible to use titanium anodes which have coatings of noble metal-based catalysts (Winnacker-Küchler, Chemische Technik, Prozesse und Produkte, 5th edition, Wiley-VCH 2005, page 515).

Electrodes for electrolysis processes are usually based on a metal belonging to the group of "valve metals". For the present purposes, valve metals are, for example, the metals titanium, zirconium, tungsten, tantalum and niobium. Owing to oxide layers on the metal surface, these act as diode material for electric current.

For use in electrolysis, an electrocatalytically active catalyst of a noble metal and/or its metal oxide is usually applied to the surface of the valve metals, with oxides of the valve metal optionally also being present in the metal oxide (WO 200602843 (ELTECH), BECK, Electrochimica Acta, Vol. 34, No. 6. pages 811-822, 1989). The oxide-forming noble metal is usually a platinum metal such as iridium, ruthenium, rhodium, palladium, platinum or mixtures thereof. Such electrodes are usually referred to as DSAs ("dimensionally stable anodes").

Disadvantages of these known electrodes for use in halide-containing electrolytes are the still high overvoltage required for evolution of chlorine, the tendency of the electrodes nevertheless to evolve oxygen, the high electrolysis voltage and the high requirement of costly noble metal for producing coatings. All these factors have an adverse effect on the economics of the known electrolysis process using such electrodes.

It is also known (DE 602005002661 T2=US 2005/0186345) that the noble metals can be eluted from the coatings of the prior art over time under electrolysis conditions, and the coatings are accordingly not sufficiently corrosion-resistant over the long term. The necessity of corrosion resistance is made clear by the fact that the loss of noble metal-containing coating leads to the electrode metal, usually the valve metal, coming into direct contact with the electrolyte and forming an oxide which is not electrically conductive on its surface. For the on-going electrolysis process, this means that electrochemical processes no longer take place on this surface, which can result in total failure of the electrolysis cell with the corresponding adverse economic consequences.

Furthermore, when an electrolyzer having noble metal-containing DSAs is used in chloride-containing solutions for preparing chlorine, it has been observed that the secondary reaction of oxygen formation cannot be fully suppressed, as a result of which oxygen is found in the product chlorine gas. The proportion of oxygen results in an increased outlay for purifying the chlorine gas and thus likewise has adverse effects on the economics of the electrolysis. The increased formation of oxygen becomes clearly apparent particularly when the chloride concentration in the electrolyte drops, in the case of electrolysis of sodium chloride solutions especially at a concentration below 200 g/l of NaCl, and when the current density is increased, especially above a current density of 5 kA/m$^2$.

Furthermore, the sole use of noble metals as catalytic electrode material likewise impairs the economics of known electrodes because of the high price and shrinking availability on the world market of these metals.

Various approaches to the production of composite electrodes in order to replace or reduce the proportion of noble metal are known from the literature.

There have thus been attempts to use carbon-containing coatings for electrodes in electrochemical processes. For example, diamond-containing coatings can be applied by CVD (chemical vapor deposition) processes to electrodes. In the case of electrolysis in a sodium sulphate anolyte containing sulphuric acid, the coating is not stable and flakes off. Furthermore, the coatings have defects and electrode metal was therefore exposed to electrochemical corrosive attack. (AiF research project 85 ZN, 2003 to 2005, final report for the period 1.01.2003 to 31.03.2005 "Entwicklung and Qualitätssicherung stabiler Diamant-beschichteter Elektroden für neuartige elektrochemische Prozesse"). The research project was terminated because the technical objective was not achieved.

Catalysts containing finely divided, carbon modifications on electrodes for preparing chlorine are known from DE102009035546A1=U.S. Pat. No. 8,492,303. A fundamental disadvantage of carbon-containing electrodes is that carbon is not thermodynamically stable in respect of oxidation. Thus, the formation of volatile carbon-oxygen species, in particular carbon dioxide, carbon monoxide, carbonic acid, hydrogencarbonate or carbonate, is basically possible under anodic electrolysis conditions in the presence of oxygen which is always obtained as by-product in any electrolysis carried out in an aqueous electrolyte. Furthermore, carbon-chlorine compounds such as carbon tetrachloride can also be formed in the anodic production of chlorine. The loss of the carbon component from composite electrodes considerably reduces the mechanical stability and the life of such electrodes. In the case of pure carbon electrodes, as were formerly used, for example, in the preparation of chlorine by electrolysis using the amalgam process, burning leads to an increased electrode spacing and increased energy consumption and likewise to a reduced life of the electrode.

Even when catalysts described in DE102009035546A1 were used at sodium chloride concentrations below 200 g/l, these carbon-containing electrodes are still unstable in the case of malfunctions (for example of the brine supply to the electrolysis cells) or incorrect operation (for example switching-on of a cell in the water-flushed state), which greatly restricts the practical usability compared to carbon-free dimensionally stable anodes (DSA) according to the prior art.

Although the use of nonaqueous electrolysis could prevent evolution of oxygen at carbon-containing electrodes as secondary reaction, it has other disadvantages, e.g. the instability of organic solvents in respect of chlorine or the low ion conductivity of such solutions, which ultimately leads to a higher energy consumption. The known use of other water-free systems such as salt melts requires a comparatively high operating temperature which can be realized only at great expense and has been found to be uneconomical compared to aqueous solvents. Furthermore, the stability of electrodes and cell materials at very high temperatures is still a challenge and limits the life of corresponding electrolysis plants.

Furthermore, the production of the carbon modifications mentioned in DE102009035546A1, e.g. diamond and fullerene, is technically difficult and associated with a high economic outlay, so that these materials are often not available in industrially required quantities and with a consistent quality.

Electrodes whose electrocatalytically active coating consists of a matrix of an electrically conductive material having electrocatalytic properties in which a nonconductive particulate or fibrous refractory material is embedded are known from DE2245709A1. The resistance to damage caused by a short circuit when used as anode in combination with a mercury cathode is improved thereby. As regards the power consumption or the overvoltage, the fibre-containing electrodes (see Ex. 1 and 3 in DE2245709A1) do not differ from fibre-free electrodes produced analogously or, when particulate materials are used (Ex. 2 in DE2245709A1) have a significantly increased overvoltage compared to Ex. 1. In terms of radiation protection, the thorium oxide mentioned in Example 2 is also undesirable in commercial electrolysis plants because of its radioactivity.

It was therefore an object of the invention to discover a catalyst by means of which the electrolysis of chloride-containing aqueous solutions can be carried out at a low electrolysis voltage even at a low chloride concentration and in which the proportion of noble metal is also reduced. A further object was to discover an electrocatalytic coating which adheres firmly to the substrate metal and is not attacked either chemically or electrochemically and has at least the same effectiveness as known coatings. A chemically stable and inexpensive catalyst which is low in noble metals should likewise be made available for the gas-phase oxidation of hydrogen chloride.

SUMMARY OF THE INVENTION

It has surprisingly been found that novel catalysts containing finely divided base metal oxide powders can be used on electrodes for preparing chlorine so as to lower the overvoltage or activation energy, where the catalytically active layer is formed of base metal oxide powder and at least one noble metal of the platinum group metals and/or an oxide thereof or mixtures thereof. Furthermore, the catalysts may additionally contain a valve metal and/or an oxide thereof or a mixture thereof and/or at least one further doped base metal oxide.

The invention provides an electrocatalyst for preparing chlorine by means of electrolysis of electrolytes containing chloride ions, which is based on at least one noble metal oxide and/or noble metal of transition group VIIIa of the Periodic Table of the Elements, in particular selected from the group consisting of: Ru, Rh, Pd, Os, Ir and Pt, wherein the catalyst additionally contains at least one finely divided pulverulent oxide of another metal, hereinafter referred to as base metal oxide powder for short, where the base metal oxide powder is chemically stable in the presence of aqueous electrolytes and the base metal oxide powder can optionally be doped with a doping element.

DETAILED DESCRIPTION

The base metal oxide powder is, in particular, selected from the group consisting of titanium oxide, tin oxide, niobium oxide, tantalum oxide, vanadium oxide, germanium oxide, tellurium oxide, lead oxide, manganese oxide, iron-antimony oxide and molybdenum oxide. Preference is given to selecting titanium oxide and/or tin oxide.

In addition, the catalyst can contain at least one valve metal oxide and/or valve metal, in particular a valve metal selected from the group consisting of Ti, Zr, W, Ta, Nb or oxides thereof and/or at least one further doped base metal oxide, in particular a compound selected from the group consisting of: antimony-doped tin oxide (ATO), indium-tin oxide (ITO), fluorine-doped tin oxide (FTO), aluminium-doped zinc oxide (AZO).

As noble metal or noble metal oxide, preference is given to one or more members of the group consisting of ruthenium, iridium, platinum, palladium and oxides thereof; particular preference is given to selecting one or more of ruthenium and iridium or ruthenium oxide and iridium oxide.

The incorporation of finely divided base metal oxide powder into the catalyst or into the surface structure of the electrode enables the noble metal content of the electrode coating to be reduced and surprisingly at the same time enables the electrolysis voltage to be reduced compared to the prior art without the oxygen content in the chlorine being increased. A further unexpected advantage of the use of the catalyst in sodium chloride electrolysis is that the sodium chloride concentration in the anolyte can be reduced from between 220 g/l to 300 g/l to less than 200 g/l of NaCl without the oxygen content in the chlorine product gas increasing or the electrolysis voltage being increased or the life of the electrode being reduced.

For the purposes of the invention, finely divided means, in particular, that the average particle diameter of the particles of the base metal oxide powder is not more than 1 µm, preferably from 1 nm to 1 µm. The average particle diameter of the particles of the base metal oxide powder is particularly preferably from 5 to 800 nm, very particularly preferably from 10 to 600 nm.

The particle diameter can be determined, for example, by means of electron microscopy of the powders or other suitable particle size analyzers, e.g. based on laser diffraction.

Preference is given to using particles of the base metal oxide powder having an average particle diameter of from 5 to 800 nm, particularly preferably from 10 to 600 nm.

The base metal oxide powder can comprise both particles having approximately spherical symmetry and also fibrous particles. In the case of fibrous particles, the above statements in respect of the average particle diameter apply to the average fibre diameter in cross section. In the case of fibrous particles, their average length (main extension of the fibre) is up to 100 µm, preferably up to 50 µm, particularly preferably up to 20 µm. The specific surface area of the base metal oxide powder (determined by means of nitrogen adsorption using the multipoint BET method at −196° C. (in a manner analogous to DIN ISO 9277)) is from 0.5 m²/g to 500 m²/g, preferably from 1.0 m²/g to 300 m²/g, particularly preferably from 2.0 m²/g to 150 m²/g.

Particularly suitable base metal oxide powders are those which are chemically stable in the presence of aqueous electrolytes. In particular, it is possible to use metal oxides which form a rutile-like crystal structure in the manner described, e.g. one or more oxides and/or mixed oxides from the group consisting of: titanium oxide, tin oxide, niobium oxide, tantalum oxide, vanadium oxide, germanium oxide, tellurium oxide, lead oxide, manganese oxide, iron-antimony oxide and molybdenum oxide. However, it is also possible to use other base metal oxide powders such as indium-tin oxide (ITO), zirconium oxide, antimony-doped tin oxide (ATO), fluorine-doped tin oxide (FTO), aluminium-doped zinc oxide (AZO), indium-doped zinc oxide (IZO), anatase, antimony oxide or zinc oxide.

The base metal oxide powders used in the catalyst can optionally also be doped. Doping enables the electrical conductivity of the base metal oxide powders to be increased and the overall conductivity of the electrocatalyst thus to be improved. Here, doping means that the proportion of the doping element is not more than 10 mol % of the metal oxide concerned. The proportion thereof is preferably from 0.0001 to 0.1 mol of doping element per mol of the total of the other metals present in the base metal oxide.

The base metal oxide powder can, in a preferred embodiment, be doped with one or more doping elements from the group consisting of: antimony, indium, niobium, tantalum, tin, aluminium and fluorine. Preference is given to tantalum- and/or niobium- and/or antimony-doped titanium oxide or tin oxide; or indium-tin oxide (tin-doped indium oxide) or fluorine-doped tin oxide (FTO) or aluminium-doped zinc oxide (AZO). Particular preference is given to antimony-doped tin oxide (ATO) and indium-tin oxide (ITO).

Preferred base metal oxide powders are those composed of titanium oxide and/or tin oxide and/or titanium oxide coated with antimony-doped tin oxide, particularly preferably titanium oxide.

Preference is given to finely divided base metal oxide powders embedded in mixtures of at least one noble metal oxide and/or noble metal and/or at least one valve metal oxide and/or valve metal and/or doped base metal oxides. These mixtures can preferably be obtained from liquid solution using suitable precursor compounds of noble metals, valve metals, base metals and doping elements. The finely divided base metal oxide powder is then added to the solutions. The suspension obtained is applied to an electrically conductive support and the electrocatalyst is then obtained by drying and sintering. The finely divided base metal oxide powders are particularly preferably embedded in mixtures of noble metal oxides and valve metal oxides and doped base metal oxides.

For the purpose of the invention, valve metals or valve metal oxides are, in particular, the metals or metal oxides from the group consisting of: titanium, zirconium, tungsten, tantalum and niobium, preferably titanium and tantalum, particularly preferably titanium, or the respective oxides thereof.

Preferred doped base metal oxides are tantalum- and/or niobium- and/or antimony-doped titanium oxide or tin oxide; or indium-tin oxide (tin-doped indium oxide) or fluorine-doped tin oxide (FTO) or aluminium-doped zinc oxide (AZO). Particular preference is given to antimony-doped tin oxide (ATO) and indium-tin oxide (ITO).

The addition of valve metal oxide and/or valve metal and/or base metal oxide which can optionally be doped in the catalyst enables less noble metal to be used. An electrically conductive solid mixture of noble metal oxide and/or noble metal with valve metal oxide and/or valve metal and/or base metal oxide which can optionally be doped is formed.

Preference is given to a catalyst comprising from 1 to 90 mol %, preferably from 5 to 80 mol %, of finely divided base metal oxide powder and from 0.05 to 40 mol %, preferably from 1 to 35 mol %, of noble metal and/or noble metal oxide and from 0 to 90 mol % of valve metal and/or valve metal oxide, and from 0 to 90 mol %, preferably from 0.01 to 80 mol %, of a doped base metal oxide.

Particular preference is given to a catalyst comprising from 20 to 70 mol % of finely divided base metal oxide, from 5 to 30 mol % of noble metal and/or noble metal oxide, and from 10 to 75 mol % of valve metal and/or valve metal oxide and from 0.1 to 20 mol % of a doped base metal oxide.

The invention further provides an electrocatalytic coating which comprises at least one novel electrocatalyst as described above, in particular including its preferred embodiments.

The invention also provides an electrode for preparing chlorine by means of electrolysis of aqueous electrolytes containing chloride ions, which comprises at least an electrically conductive support and a catalytically active coating, wherein the catalytically active coating contains a novel catalyst as described above, in particular including its preferred embodiments.

Preference is given to an electrode wherein the electrically conductive support is formed by a valve metal from the group consisting of: titanium, zirconium, tungsten, tantalum and niobium, preferably by titanium, particularly preferably titanium or alloys thereof or tantalum, particularly preferably based on titanium or titanium alloys. Suitable titanium alloys which are preferably more corrosion-resistant than pure titanium and can preferably be used for the electrolysis of hydrochloric acid contain, for example, palladium, or nickel and palladium and ruthenium and chromium, or nickel and molybdenum, or aluminium and niobium. In the case of a titanium alloy, preference is given to titanium-palladium (0.2% by weight of Pd) and/or titanium-nickel-chromium-ruthenium-palladium (from 0.35 to 0.55% by weight of Ni, from 0.1 to 0.2% by weight of Cr, from 0.02 to 0.04% of Ru and from 0.01 to 0.02% by weight of Pd).

For the process of the invention, particular preference is given to using titanium as material for the support and optionally as addition to the coating.

Electrodes having electrode coatings which contain the catalyst comprising finely divided base metal oxide powders can be used not only in the above-described applications in chlorine production but, as an alternative, also for generating electric current in, for example, fuel cells and batteries, in redox capacitors, in the electrolysis of water, the regeneration of chromium baths, in the use of fluoride-containing electrolytes in hydrogen peroxide, ozone or peroxodisulphate production. These uses are also provided by the invention.

In a preferred embodiment of the novel electrode, the loading is from 0.1 to 30 g of noble metal/m² or from 0.1 to 75 g of finely divided base metal oxide/m². The area is the projected electrode surface. Electrodes for chlorine production usually consist of expanded metals or louver structures. The amount of noble metal or finely divided base metal oxide is then based on a surface area which can be calculated from the external dimensions. The amount of noble metal or finely divided base metal oxide applied per m² can be set by means of the concentration of the applied solution or by the number of repetition cycles. The individual cycles can be interrupted by drying and/or sintering cycles. Drying or sintering can be carried out under reduced pressure and/or in other gas atmospheres.

The invention also provides a process for producing electrodes for preparing chlorine, wherein a layer of at least one finely divided base metal oxide power, particularly preferably titanium oxide, and at least one noble metal oxide and/or noble metal of transition group VIIIa of the Periodic Table of the Elements, in particular selected from the group consisting of: Ru, Rh, Pd, Os, Ir and, Pt, and optionally also at least one valve metal or a valve metal oxide or mixtures thereof and optionally a doped base metal oxide is applied to an electrically conductive support, in particular consisting of a valve metal of the group consisting of titanium, zirconium, tungsten, tantalum and niobium, preferably titanium, by applying a mixture of base metal oxide powder, a solvent and a noble metal compound which is preferably soluble in the solvent and optionally a soluble valve metal compound and/or a soluble base metal compound and optionally a soluble doping element compound to the electrically conductive support and drying to remove solvent and subsequently sintering at elevated temperature.

A particular embodiment of the novel process comprises applying the catalysts to an electrode structure formed of a valve metal as follows:

For this purpose, the electrode structure is firstly sand blasted. It can subsequently be pickled by means of an acid such as hydrochloric acid or oxalic acid to remove oxides on the surface. Pickling can be carried out at room temperature or else in an accelerated procedure at elevated temperature.

To coat the surface, it is possible to use, for example, a suspension of at least one noble metal compound, at least one solvent selected from the group consisting of $C_1$-$C_6$-alcohol, preferably butanol or isopropanol, water, a mineral acid, a valve metal compound and the base metal oxide powder.

Further metals or metal compounds and doping elements can be added if required to this suspension, so that the base metal oxide powder is embedded in an electrically conductive mixture of noble metal oxide and/or valve metal oxide and/or doped base metal oxide in the finished catalyst.

The suspension for producing the catalyst preferably comprises up to 20% by weight, particularly preferably up to 10% by weight, of insoluble solid, based on the total weight of the suspension including solvent. However, it is also possible to produce suspensions having a lower solids content when the coating process is to be carried out in an increased number of cycles. An increased number of cycles is particularly advantageous when a more uniform noble metal distribution is to be achieved at a very low noble metal content.

Nobel metal precursor compounds used are fluorides, chlorides, iodides, bromides, nitrates, phosphates, sulphates, acetates, acetylacetonates or alkoxides of the elements Ru, Rh, Pd, Os, Ir and Pt which are soluble in the solvent, preferably ruthenium chloride and/or iridium chloride.

Preferred valve metal precursor compounds are fluorides, chlorides, iodides, bromides, nitrates, phosphates, sulphates, acetates, acetylacetonates or alkoxides of the elements titanium, zirconium, tungsten, tantalum and niobium which are soluble in the solvent, preferably at least one titanium alkoxide selected from the group consisting of: titanium 2-ethylhexyloxide, titanium ethoxide, titanium isobutoxide, titanium isopropoxide, titanium methoxide, titanium n-butoxide, titanium n-propoxide, particularly preferably titanium n-butoxide and/or titanium isopropoxide.

It is possible to add a little acid which aids the hydrolysis of the valve metal compound. Suitable acids are those selected from the group consisting of: toluenesulphonic acid, sulphuric acid, sulphurous acid, phosphoric acid, phosphorous acid, phosphonic acid, sulphonic acids, block sulphonic acids, blocked sulphuric and phosphoric acids, carboxylic acids, dicarboxylic acids, hydrochloric acid, nitric acid and nitrous acid.

However, it is also possible to use a coating solution or dispersion having a significant excess of acid based on the metallic components present in the coating solution.

Finely divided base metal oxide powder, which can also be doped, can be added to this solution or suspension. It is also possible to add base metal precursor compounds and doping element precursor compounds which after drying and/or sintering form a doped base metal oxide. Suitable base metal precursor compounds are fluorides, chlorides, iodides, bromides, nitrates, phosphates, acetates, acetylacetonates and/or alkoxides of the elements antimony, lead, iron, germanium, indium, manganese, molybdenum, niobium, tantalum, titanium, tellurium, vanadium, zinc, tin and/or zirconium which are soluble in the solvent.

Preferred base metal compounds are titanium compounds selected from the group consisting of: titanium fluoride, titanium chloride, titanium iodide, titanium bromide, titanium 2-ethylhexyloxide, titanium ethoxide, titanium isobutoxide, titanium isopropoxide, titanium methoxide, titanium n-butoxide, and titanium n-propoxide, and/or indium compounds selected from the group consisting of indium fluoride, indium chloride, indium iodide, indium bromide, indium nitrate, indium phosphate, indium acetate, indium acetylacetonate, indium ethoxide, indium propoxide, and indium butoxide, and/or manganese compounds selected from the group consisting of manganese fluoride, manganese chloride, manganese iodide, manganese bromide, manganese nitrate, manganese phosphate, manganese acetate, manganese acetylacetonate, manganese methoxide, manganese ethoxide, manganese propoxide, and manganese butoxide, and/or tin compounds selected from the group consisting of tin fluoride, tin chloride, tin iodide, tin bromide, tin acetate, tin acetylacetonate, tin methoxide, tin ethoxide, tin propoxide, and tin butoxide, and/or zinc compounds selected from the group consisting of zinc fluoride, zinc chloride, zinc iodide, zinc bromide, zinc nitrate, zinc phosphate, zinc acetate, and zinc acetylacetonate.

Particularly preferred base metal precursor compounds are tin chloride and/or indium chloride.

Suitable doping element precursor compounds are fluorine compounds and/or fluorides, chlorides, iodides, bromides, nitrates, phosphates, sulphates, acetates, acetylacetonates and/or alkoxides of the elements aluminium, antimony, tantalum, niobium, tin, indium which are soluble in the solvent. Preferred doping element precursor compounds are fluorine compounds selected from the group consisting of fluoroacetic acid, difluoroacetic acid, trifluoroacetic acid, hydrogen fluoride, ammonium fluoride, and tetramethylammonium fluoride and/or aluminium compounds selected from the group consisting of aluminium fluoride, aluminium chloride, aluminium iodide, aluminium bromide, aluminium nitrate, aluminium phosphate, aluminium sulphate, aluminium acetate, aluminium acetylacetonate, aluminium ethoxide, aluminium propoxide, and aluminium butoxide and/or antimony compounds selected from the group consisting of antimony fluoride, antimony chloride, antimony iodide, antimony bromide, antimony sulphate, antimony acetate, antimony acetylacetonate, antimony methoxide, antimony ethoxide, antimony propoxide, and antimony butoxide
and/or tantalum compounds selected from the group consisting of tantalum fluoride, tantalum chloride, tantalum iodide, tantalum bromide, tantalum methoxide, and tantalum ethoxides
and/or niobium compounds selected from the group consisting of niobium fluoride, niobium chloride, niobium iodide, niobium ethoxide, niobium propoxide, and niobium butoxide
and/or indium compounds selected from the group consisting of indium fluoride, indium chloride, indium iodide, indium bromide, indium nitrate, indium phosphate, indium sulphate, indium acetate, indium acetylacetonate, indium ethoxide, indium propoxide, and indium butoxide
and/or tin compounds selected from the group consisting of tin fluoride, tin chloride, tin iodide, tin bromide, tin sulphate, tin acetate, tin acetylacetonate, tin methoxide, tin ethoxide, tin propoxide, and tin butoxide.

Particularly preferred doping element precursor compounds are antimony chloride and/or tin chloride.

The addition of the valve metal compound and/or further base metal compounds enables the noble metal content of the catalyst to be reduced further and an electrically conductive matrix composed of noble metal oxide and/or noble metal, valve metal oxide and/or valve metal and doped base metal oxide in which the finely divided, optionally doped base metal oxide powder is embedded is obtained in the finished catalyst.

The viscosity can be matched to the respective application process by varying the composition of the suspension. For this purpose, it is possible to use, for example, basically known thickeners such as nonionic, water-soluble polyethylene oxide polymers and/or water-soluble methylcellulose and/or hydroxypropylmethylcellulose polymers, stabilizers such as polyvinyl alcohol and/or polyacrylic acid and/or polyvinylpyrrolidone and wetting additives such as anionic surfactants, e.g. sodium dodecylsulphate, or cationic surfactants, e.g. dodecyltrimethylammonium chloride, or nonionic surfactants, e.g. polyethylene glycol monolaurate.

The suspension produced is preferably applied to the surface of the support in a plurality of cycles. This can be achieved by brushing, spraying, flooding or dipping the support into the coating dispersions. Other application methods, e.g. printing processes, are likewise conceivable. After an application cycle, the liquid components of the suspension are removed by drying. There is now the opportunity of commencing a fresh application step or the electrode can, after drying, be subjected to sintering at a temperature of at least 300° C. After this, the suspension can again be applied, dried and sintered.

Drying of the coating can be carried out at atmospheric pressure or under reduced pressure, preferably in an oxygen-containing gas, particularly preferably air or optionally under a protective gas, in particular at least one gas from the group consisting of: nitrogen and noble gases, in particular helium, neon, argon or krypton. In the case of an oxygen-containing gas such as air, a largely oxidic catalyst is generally obtained. When protective gas is used, a metal oxide mixture can be obtained. This likewise applies to sintering of the coating.

It is likewise conceivable to alter the formulation of the suspension during the various application and drying cycles and thus produce gradients in the make-up of the coating. Thus, preference is given to firstly coating the electrode metal with a low noble metal content and increasing the noble metal content in further coating cycles.

It is likewise conceivable to mix various base metal oxide powders into the suspension.

The invention further provides an electrode obtained by the novel coating process.

The invention is illustrated by way of example below.

EXAMPLES

Example 1: Comparative Example Using Commercial Anodes for the NaCl Electrolysis and Electrolysis Test)

a) A standard expanded metal anode provided with a ruthenium-containing coating from De Nora was used for the NaCl electrolysis. Here, the projected base area of the anode in the laboratory cell used was 10 cm*10 cm, the anode support material consisted of titanium and had the form of expanded metal characterized by a mesh opening of 8 mm, a land width of 2 mm and a land thickness of 2 mm. An ion-exchange membrane from Dupont, type Nafion 982, was used between anode space and cathode space. A standard cathode composed of nickel from De Nora provided with a ruthenium-containing coating served as cathode for the NaCl electrolysis. The electrode spacing was 3 mm. An NaCl-containing solution having a sodium chloride concentration of 210 g/, a volume flow in the range from 5 to 10 l/h and a temperature of 88° C. was introduced into the anode space of the electrolysis cell. On the cathode side of the cell, a sodium hydroxide solution having an NaOH concentration of 31.5% by weight, /, a volume flow in the range from 5 to 10 l/h and a temperature of 88° C. was introduced. The current density was 4 kA/m$^2$, calculated on the basis of the membrane area of 10 cm*10 cm. The chlorine concentration of the gas leaving the anode chamber was 97% by volume. The electrolysis voltage was 3.05 V.

b) The cell described in a) was modified by using an oxygen-consuming cathode based on an electrolytically gilded nickel expanded metal as current distributor, produced as described in the patent text DE102010031571A1 (Example 5), as cathode. As additional reactant, cathodic oxygen (purity>99.5%) was supplied at a volume flow of from 45 to 55 l/h to the rear side of the oxygen-consuming cathode. At a current density of 4 kA/m$^2$, a temperature of 90° C. and a sodium hydroxide concentration of 32% by weight, the electrolysis voltage was 2.12 V at a chlorine concentration in the gas leaving the anode chamber of 96.8%.

Example 2: (Comparative Example)

A coating solution consisting of 2.02 g of ruthenium(III) chloride hydrate (Ru content 40.6% by weight), 1.50 g of iridium(III) chloride hydrate (Ir content 54.7%), 17.4 ml of n-butanol, 1.1 ml of conc. hydrochloric acid, 6 ml of tetra-n-butyl titanate (Ti—(O-Bu)$_4$) is mixed. This solution is applied by means of a brush to titanium expanded metal which has been sand blasted and subsequently pickled in 10% strength oxalic acid at 90° C. for 30 minutes as support. The expanded metal is subsequently dried at 80° C. for 10 minutes and then sintered at 470° C. for 10 minutes. The application process is repeated five times, likewise drying and sintering. The last sintering is carried out at 470° C. for 60 minutes. The noble metal loading was 11.0 g of Ru/m$^2$ and 11.0 g of Ir/m$^2$. The surface produced has a composition of 27.0 mol % of Ru, 14.2 mol % of Ir and 58.8 mol % of Ti. This anode which had been treated in this way was used in a cell as described in Example 1 in the electrolysis of sodium chloride using a standard commercial cathode. The chlorine concentration in the gas leaving the anode chamber was 97.4% by volume. The electrolysis voltage was 3.06 V.

Example 3: TiO$_2$—RuO$_2$ Mixed Oxide Prepared by Thermal Decomposition (Comparative Example)

To produce a coating by thermal decomposition, a coating solution containing 2.00 g of ruthenium(III) chloride hydrate (Ru content 40.5% by weight), 21.56 g of n-butanol, 0.94 g of concentrated hydrochloric acid and 5.93 g of tetra-n-butyl titanate was produced. Part of the coating solution was applied by means of a brush to a titanium plate which had been pickled beforehand in 10% by weight of oxalic acid at about 90° C. for 0.5 hour. This was, after application of the coating, dried in air at 80° C. for 10 minutes and subsequently treated in air at 470° C. for 10 minutes. This operation (application of solution, drying, heat treatment) was carried out a total of eight times. The plate was subsequently treated in air at 520° C. for one hour. The ruthenium loading per unit area was determined from the consumption of the coating solution and found to be 16.1 g/m$^2$, at a composition of 31.5 mol % of RuO$_2$ and 68.5 mol % of TiO$_2$.

Example 4: TiO$_2$—RuO$_2$—IrO$_2$ Mixed Oxide Prepared by Thermal Decomposition (Comparative Example)

To produce a coating by thermal decomposition, a coating solution containing 0.99 g of ruthenium(III) chloride hydrate (Ru content 40.5% by weight), 0.78 g of iridium(III) chloride hydrate (Ir content 50.9% by weight), 9.83 g of n-butanol, 0.29 g of concentrated hydrochloric acid and 5.9 g of tetra-n-butyl titanate was produced. Part of the coating solution was applied by means of a brush to a titanium plate which had been pickled beforehand in 10% by weight of oxalic acid at about 90° C. for 0.5 hour. This was, after application of the coating, dried in air at 80° C. for 10 minutes and subsequently treated in air at 470° C. for 10 minutes. This operation (application of solution, drying, heat treatment) was carried out a total of eight times. The plate was subsequently treated in air at 470° C. for one hour. The ruthenium loading per unit area was determined from the weight increase and in each case found to be 5.44 g/m$^2$, the iridium loading per unit area was correspondingly found to be 5.38 g/m$^2$ (total noble metal loading 10.83 g/m$^2$), at a composition of 17.0 mol % of RuO$_2$, 8.7 mol % of IrO$_2$ and 74.3 mol % of TiO$_2$.

Example 5: Solvent-Containing Synthesis Using 11 Mol % of Ru—Addition of TiO$_2$/ATO Particles (According to the Invention)

a) Titanium plates having a diameter of 15 mm (thickness 2 mm) were, for the purpose of cleaning and roughening the surface, sandblasted and subsequently pickled in 10% strength oxalic acid at 80° C. (30 minutes) and subsequently cleaned with isopropanol.
A titanium expanded metal having the geometry described in Example 1 was sandblasted.

Production of the coating solution:
Solution 1: 1.12 g of Tipaque ET-500W from Ishihara Corporation (particle size 200-300 nm; BET surface area 6-8 m$^2$/g; density 4.6 g/cm$^3$; TiO$_2$ in rutile form covered with a thin electrically conductive layer of antimony-doped tin oxide (ATO, SnO$_2$:Sb) was dispersed in 16.03 g of n-butanol by means of ultrasound for 1 hour.
Solution 2: 0.52 g of ruthenium(III) chloride hydrate (Ru content 40.35% by weight), 1.59 g of tetra-n-butyl titanate and 0.25 g of conc. hydrochloric acid were dissolved in 16.0 g of n-butanol.
Solution 2 was added dropwise to solution 1 while stirring and stirred for 96 hours. The coating solution was dripped four times onto titanium plates and, in parallel, brushed four times onto titanium expanded metal.
The ruthenium loading per unit area was determined from the weight increase of the plate and found to be 2.48 g/m$^2$, at a composition of 10.9 mol % of RuO$_2$, 80.0 mol % of TiO$_2$ and 9.1 mol % of SnO$_2$:Sb (ATO), where the distribution of TiO$_2$ and ATO (SnO$_2$:Sb$_2$O$_5$) in Tipaque ET-500 W was calculated from the density indicated by the manufacturer. The concentration of Tipaque ET-500 W was 63.2% by weight. The ruthenium loading per unit area of the expanded metal was about 1.1 g/m$^2$.
After each application of the solution, the coated plate was dried at 80° C. for 10 minutes and subsequently sintered (in air) at 470° C. for 10 minutes. After application of the last layer, sintering was carried out at 520° C. for 1 hour.
b) A further expanded metal was pretreated and coated as described under a) above, with the only difference that twelve instead of four application cycles using the coating solution were now carried out, with analogous drying and sintering in each case. The ruthenium loading per unit area of the expanded metal was 3.1 g/m$^2$ at the same composition as under a).

Example 6: Solvent-Containing Synthesis Using 11 Mol % of Ru—Addition of TiO$_2$/ATO Fibres (According to the Invention)

Titanium plates having a diameter of 15 mm (thickness 2 mm) were, for the purpose of cleaning and roughening the surface, sandblasted and subsequently pickled in 10% strength oxalic acid at 80° C. (30 minutes) and subsequently cleaned with isopropanol.
Solution 1: 0.45 g of Tipaque FT-1000 from Ishihara Corporation (TiO$_2$ (rutile) fibres covered with an antimony-doped tin oxide (ATO) layer. Fibre diameter 130 nm, fibre length 1.68 μm; BET surface area 12-18 m$^2$/g; density 4.4 g/cm$^3$) was dispersed in 6.4 g of n-butanol by means of ultrasound for 1 hour.
Solution 2: 0.21 g of ruthenium(III) chloride hydrate (Ru content 40.35% by weight), 0.64 g of titanium(IV) n-butoxide and 0.1 g of conc. hydrochloric acid were dissolved in 6.4 g of n-butanol.
Solution 2 was added dropwise to solution 1 while stirring and stirred for 96 hours. The coating solution was dripped four times onto titanium plates.
The ruthenium loading per unit area was determined from the weight increase of the plate and found to be 3.60 g/m$^2$, at a composition of 10.5 mol % of RuO$_2$, 84.9 mol % of TiO$_2$ and 4.6 mol % of SnO$_2$:Sb (ATO), where the distribution of TiO$_2$ and ATO (SnO$_2$:Sb$_2$O$_5$) in Tipaque FT-1000 was calculated from the density indicated by the manufacturer. The concentration of Tipaque FT-1000 was 63.0% by weight.
After each application of the solution, the coated plate was dried at 80° C. for 10 minutes and subsequently sintered (in air) at 470° C. for 10 minutes. After application of the last layer, sintering was carried out at 520° C. for 1 hour.

Example 7: Solvent-Containing Synthesis Using 11 Mol % of Ru—Addition of $TiO_2$ Particles (According to the Invention)

Titanium plates having a diameter of 15 mm (thickness 2 mm) were, for the purpose of cleaning and roughening the surface, sandblasted and subsequently pickled in 10% strength oxalic acid at 80° C. (30 minutes) and subsequently cleaned with isopropanol.

Production of the coating solution:

Solution 1: 1.02 g of crenox TR-HP-2 from crenox GmbH (BET surface area 5-7 $m^2/g$; density 4.2 $g/cm^3$; $TiO_2$ (rutile form) 99.5% purity, average particle size 206 nm (determined from an electron micrograph as average of 38 particles) were dispersed in 15.03 g of n-butanol by means of ultrasound for 1 hour.

Solution 2: 0.52 g of ruthenium(III) chloride hydrate (Ru content 40.35% by weight) 1.59 g of tetra-n-butyl titanate and 0.25 g of conc. hydrochloric acid were dissolved in 15.03 g of n-butanol.

Solution 2 was added dropwise to solution 1 while stirring and stirred for 96 hours The coating solution was dripped four times onto titanium plates.

The ruthenium loading per unit area was determined from the weight increase of the plate and found to be 2.73 $g/m^2$, at a composition of 10.7 mol % of $RuO_2$ and 89.3 mol % of $TiO_2$. The concentration of crenox TP-HR-2 was 61.1% by weight.

After each application of the solution, the coated plate was dried at 80° C. for 10 minutes and subsequently sintered (in air) at 470° C. for 10 minutes. After application of the last layer, sintering was carried out at 520° C. for 1 hour.

Example 8: Solvent-Containing Synthesis Using 11 Mol % of Ru—Addition of $TiO_2$ Particles and Antimony-Doped Tin Oxide (According to the Invention)

Titanium plates having a diameter of 15 mm (thickness 2 mm) were, for the purpose of cleaning and roughening the surface, sandblasted and subsequently pickled in 10% strength oxalic acid at 80° C. (30 minutes) and subsequently cleaned with isopropanol.

Production of the coating solution:

Solution 1: 960 mg of crenox TR-HP-2 from crenox GmbH (BET surface area 5-7 $m^2/g$; density 4.2 $g/cm^3$; $TiO_2$ (rutile form) 99.5% purity, density 4.2 $g/cm^3$, average particle size 206 nm) was dispersed in a solution of 218 mg of tin(IV) chloride pentahydrate and 9 mg of antimony(III) chloride in 15.32 g of n-butanol by means of ultrasound for 1 hour.

Solution 2: 0.52 g of ruthenium(III) chloride hydrate (Ru content 40.35% by weight), 1.59 g tetra-n-butyl titanate and 0.25 g of conc. hydrochloric acid were dissolved in 15.32 g of n-butanol.

Solution 2 was added dropwise to solution 1 while stirring and stirred for 96 hours The coating solution was dripped four times onto titanium plates.

The ruthenium loading per unit area was determined from the weight increase of the plate and found to be 4.13 $g/m^2$, at a composition of 10.7 mol % of $RuO_2$, 86.0 mol % of $TiO_2$, 3.2 mol % of $SnO_2$ and 0.1 mol % of $Sb_2O_5$. The concentration of crenox TP-HR-2 was 56.2% by weight.

After each application of the solution, the coated plate was dried at 80° C. for 10 minutes and subsequently sintered (in air) at 470° C. for 10 minutes. After application of the last layer, sintering was carried out at 520° C. for 1 hour.

Example 9: (Comparative Example)

A coating was produced in a manner analogous to Example 8, with the only difference that the finely divided titanium oxide powder according to the invention (crenox TR-HP-2, structure: rutile type) was replaced by a significantly coarser titanium oxide powder having an anatase structure (Sigma-Aldrich titanium(IV) oxide, anatase −325 mesh, product number 248576 having particle sizes of up to 45 μm). The loading of ruthenium per unit area was determined from the weight increase of the plate and found to be 4.28 $g/m^2$, at a composition of 10.7 mol % of $RuO_2$, 86.0 mol % of $TiO_2$, 3.2 mol % of $SnO_2$ and 0.1 mol % of $Sb_2O_5$.

Example 10: (Comparative Example)

A coating was produced in a manner analogous to Example 8, with the difference that no $TiO_2$ powder (crenox TR-HP-2) was added and instead the amount of tetra-n-butyl titanate in the formulation was increased to 5.68 g, so that the same composition was obtained without addition of powder. The ruthenium loading per unit area was calculated from the weight increase of the plate and found to be 3.83 $g/m^2$, at a composition of 10.7 mol % of $RuO_2$, 86.0 mol % of $TiO_2$, 3.2 mol % of $SnO_2$ and 0.1 mol % of $Sb_2O_5$.

Example 11: Combination Production from Using Finely Divided Particle Addition and an Excess of Acid Titanium plates having a diameter of 15 mm (thickness 2 mm) were, for the purpose of cleaning and roughening the surface, sandblasted and subsequently pickled in 10% strength oxalic acid at 80° C. (30 minutes) and subsequently cleaned with isopropanol.

Production of the coating solution:

Solution 1: 1.59 g of tetra-n-butyl titanate were added dropwise to an initial charge of 4.77 g of acetic acid with vigorous stirring while cooling in an ice bath, with at least 1 minute of stirring time elapsing between two drops. The clear solution formed was subsequently stirred for a further 12 hours while cooling.

Solution 2: 0.96 g of crenox TR-HP-2 from crenox GmbH (BET surface area 5-7 $m^2/g$; density 4.2 $g/cm^3$; $TiO_2$ (rutile form) 99.5% purity, density 4.2 $g/cm^3$, average particle size 206 nm (determined from an electron micrograph as average of 38 particles) was dispersed in a solution of 0.52 g of ruthenium(III) chloride hydrate (Ru content 40.35% by weight), 216 mg of tin(IV) chloride pentahydrate and 9 mg of antimony(III) chloride in 26.11 g of demineralized water by means of ultrasound for 1 hour. Solution 2 was added dropwise to solution 1, with solution 1 being cooled in an ice bath and being vigorously stirred. The product was then stirred for a further 96 hours.

The coating solution was dripped four times onto titanium plates. The ruthenium loading per unit area was determined from the weight increase of the plate and found to be 4.85 $g/m^2$, at a composition of 86.0 mol % of $TiO_2$, 10.7 mol % of $RuO_2$, 3.2 mol % of $SnO_2$ and 0.1 mol % of $Sb_2O_5$.

After each application of the solution, the coated plate was dried at 80° C. for 10 minutes and subsequently (in air) at 470° C. for 10 minutes. After application of the last layer, sintering was carried out at 520° C. for 1 hour.

Example 12: (Electrochemical Test on Plates)

The electrochemical activity for evolution of chlorine was measured on the laboratory scale by recording of polarization curves for samples on titanium electrodes (15 mm diameter, 2 mm thickness) from Examples 3 to 11.

Experimental parameters: measured in 200 g/l NaCl (pH=3) with a flow of 100 ml/min at 80° C., galvanostatically for 5 minutes per current step, potential measured relative to Ag/AgCl and converted to standard hydrogen electrode (SHE), potential values corrected by ohmic voltage drop in the cell (referred to as IR correction), counterelectrode: platinated titanium expanded metal, current density 4 kA/m$^2$.

The potentials (vs. NHE) at a current density of in each case 4 kA/m$^2$ were
For sample from Example 3: 1.423 V
For sample from Example 4: 1.403 V
For sample from Example 5a): 1.350 V;
For sample from Example 6: 1.411 V;
For sample from Example 7: 1.427 V
For sample from Example 8: 1.390 V
For sample from Example 9: 1.709 V
For sample from Example 10: 1.572 V
For sample from Example 11: 1.388 V Examples 5a) to 8 and 11 according to the invention containing base metal oxide powder give, at a significantly reduced noble metal concentration in the catalyst and at the same time a lower noble metal loading, lower or similar potentials for evolution of chlorine compared to Comparative Examples 3 and 4. A lower potential is likewise obtained by addition of base metal oxide powder in combination with an excess of acid (see Ex. 11 according to the invention,). When coarser base metal oxide powder (particle size up to 45 μm, anatase type, Ex. 9) is added, a very high potential is obtained, meaning a higher energy consumption in the electrolysis. A high potential is likewise obtained without addition of fine particles (Ex. 10).

Example 13: Laboratory Electrolysis

The coating on titanium expanded metal from Example 5a) was used as anode in a cell as in Example 1 a) in the electrolysis of sodium chloride using a standard commercial cathode. The electrolysis voltage was 3.00 V after 4 days, and the current density was subsequently increased to 6 kA/m$^2$ and the NaCl concentration was reduced to 180 g/l. After an initial 3.22 V, the electrolysis voltage decreased somewhat further, to 3.19 V after 5 days at 6 kA/m$^2$. The average electrolysis voltage over the next 50 days of operation then continued to be 3.19 V. The current density of 4 kA/m$^2$ was subsequently restored at a brine concentration of 210 g/l and the electrolysis voltage was 2.92 V.

Example 14: Laboratory Electrolysis

The coating on titanium expanded metal from Example 5b) was used as anode in a cell as in Example 1b) in the electrolysis of sodium chloride using an oxygen-consuming cathode.

At a current density of 4 kA/m$^2$, a temperature of 90° C. and a sodium hydroxide concentration of 32% by weight, the electrolysis voltage was 2.07 V at a chlorine concentration in the gas leaving the anode chamber of 97.2%.

The invention claimed is:

1. Electrocatalyst for preparing chlorine by electrolysis of electrolytes containing chloride ions, comprising at least one noble metal oxide and/or noble metal of transition group VIIIa of the Periodic Table of the Elements wherein the catalyst further comprises at least one base metal oxide powder, wherein the base metal oxide powder is chemically stable in the presence of aqueous electrolytes, wherein the based metal oxide powder further comprises an electrically conductive matrix composed of noble metal oxide and/or noble metal, valve metal oxide and/or valve metal and/or doped base metal oxide in which the finely divided, optionally doped, base metal oxide powder is embedded, and wherein the average particle diameter of the particles of base metal oxide powder is not more than 1 μm.

2. Electrocatalyst according to claim 1, wherein said noble metal or noble metal oxide is one or more members of the group consisting of ruthenium, iridium, platinum, palladium and oxides thereof.

3. Electrocatalyst according to claim 2, wherein the noble metal or noble metal oxide is one or more of ruthenium and iridium or ruthenium oxide and iridium oxide.

4. Electrocatalyst according to claim 1, wherein the base metal oxide of the base metal oxide powder comprises one or more oxides and/or mixed oxides selected from the group consisting of titanium oxide, tin oxide, niobium oxide, tantalum oxide, vanadium oxide, germanium oxide, tellurium oxide, lead oxide, manganese oxide, iron-antimony oxide and molybdenum oxide.

5. Electrocatalyst according to claim 1, wherein the base metal oxide of the base metal oxide powder comprises titanium oxide, tin oxide or both.

6. Electrocatalyst according to claim 1, wherein the catalyst further comprises a further doped base metal oxide selected from the group consisting of antimony-doped tin oxide (ATO), indium-tin oxide (ITO), fluorine-doped tin oxide (FTO), aluminium-doped zinc oxide (AZO), and indium-doped zinc oxide (IZO).

7. Electrocatalyst according to claim 1, wherein the base metal oxide powder comprises both particles having approximately spherical symmetry and fibrous particles.

8. Electrocatalyst according to claim 7, wherein the base metal oxide powder comprises fibrous particles having an average length of up to 100 μm.

9. Electrocatalyst according to claim 1, wherein the specific surface area of the base metal oxide powder is from 0.5 m$^2$/g to 500 m$^2$/g.

10. Electrocatalyst according to claim 1, wherein the base metal oxide of the base metal oxide powder is doped with one or more doping elements selected from the group consisting of antimony, niobium, tantalum, iridium and fluorine, the proportion of which is from 0.0001 to 0.1 mol of doping element per mol of total other metals present in the base metal oxide.

11. Electrocatalyst according to claim 1, wherein the catalyst comprises from 1 to 90 mol % of finely divided base metal oxide powder and from 0.05 to 40 mol % of noble metal and/or noble metal oxide and from 0 to 90 mol % of valve metal and/or valve metal oxide, and from 0 to 90 mol % of a doped base metal oxide.

12. Electrocatalyst according to claim 1, wherein the catalyst comprises from 20 to 70 mol % of finely divided base metal oxide, from 5 to 30 mol % of noble metal and/or noble metal oxide and from 10 to 75 mol % of valve metal and/or valve metal oxide and from 0.1 to 20 mol % of a doped base metal oxide.

13. Electrocatalytic coating comprising at least one electrocatalyst according to claim 1.

14. Electrode for preparing chlorine by electrolysis of aqueous electrolytes containing chloride ions, which is formed of at least an electrically conductive support and a catalytically active coating, wherein the catalytically active coating contains an electrocatalyst of claim 1.

15. Electrode according to claim 14, wherein the electrically conductive support is formed of a valve metal selected from the group consisting of titanium, zirconium, tungsten, tantalum and niobium.

16. Electrode according to claim 14 wherein the loading of the electrode is from 0.1 to 30 g of noble metal/m$^2$ and from 0.1 to 75 g of finely divided base metal oxide/m$^2$.

17. Process for producing the electrode of claim 14, wherein a layer of at least one finely divided base metal oxide power and at least one noble metal oxide and/or noble metal of transition group VIIIa of the Periodic Table of the Elements and optionally also of at least one valve metal or a valve metal oxide or mixtures thereof and optionally also a doped base metal oxide powder is applied to an electrically conductive support formed of a valve metal selected from the group consisting of titanium, zirconium, tungsten, tantalum and niobium, by applying a mixture of base metal oxide powder, a solvent and a noble metal compound and a soluble base metal compound and optionally a soluble valve metal compound and/or optionally a soluble doping element compound to the electrically conductive support and drying to remove solvent and subsequently sintering at elevated temperature.

18. Electrode produced by the process of claim 17.

19. Method for the electrochemical preparation of chlorine from hydrogen chloride solutions or alkali metal chloride solutions, or for generating electric current, in the electrolysis of water, the regeneration of chromium baths, or in the use of fluoride-containing electrolytes in hydrogen peroxide, ozone or peroxodisulphate production with the electrode of claim 14.

20. Electrode according to claim 14 wherein the average particle diameter of the particles of the base metal oxide powder is from 5 to 800 nm.

\* \* \* \* \*